United States Patent
Panin et al.

(10) Patent No.: US 7,465,927 B2
(45) Date of Patent: Dec. 16, 2008

(54) ATTENUATION CORRECTION FOR NUCLEAR MEDICAL IMAGING SCANNERS WITH SIMULTANEOUS TRANSMISSION AND EMISSION ACQUISITION

(75) Inventors: Vladimir Panin, Knoxville, TN (US); Maurizio Conti, Knoxville, TN (US); Michael E. Casey, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 190 days.

(21) Appl. No.: 11/387,263

(22) Filed: Mar. 23, 2006

(65) Prior Publication Data

US 2007/0221850 A1    Sep. 27, 2007

(51) Int. Cl.
*G01T 1/164* (2006.01)
(52) U.S. Cl. ............................................... 250/363.03
(58) Field of Classification Search ............ 250/363.01, 250/363.02, 363.03, 363.04, 363.05, 363.06, 250/363.07, 363.08, 363.09, 363.1, 370.01, 250/370.13, 370.09
See application file for complete search history.

(56) References Cited

U.S. PATENT DOCUMENTS

| | | | | |
|---|---|---|---|---|
| 5,391,877 A * | 2/1995 | Marks | | 250/363.04 |
| 6,399,951 B1 * | 6/2002 | Paulus et al. | | 250/370.13 |
| 6,490,476 B1 | 12/2002 | Townsend et al. | | |
| 2005/0189494 A1 * | 9/2005 | Conwell | | 250/363.04 |
| 2006/0214097 A1 * | 9/2006 | Wang et al. | | 250/252.1 |

OTHER PUBLICATIONS

Thompson et al, "Simultaneous Transmission and Emission Scans in Positron Emission Tomography", IEEE Trans. Nuci. Sci, vol. 36, 1989, pp. 1011-1016.

Watson et al., "Design and Performance of a Single Photon Transmission Measurement for the ECAT ART", 1997 MIC Conf. Rec., M9-02, 1998, pp. 1366-1370.

De Jong et al., Correction for Emission Contamination in Transmission Scans for the High Resolution Research Tomograph, IEEE Transactions on Nuclear Science, vol. 51, No. 3, Jun. 2004, pp. 673-676.

Sibomana et al, "Simultaneous Measurement of Transmission and Emission Contamination Using a Collimated 137Cs Point Source for the HRRT", Nuclear Science Symposium Conference Record, vol. 4, IEEE, Oct. 16-22, 2004, pp. 2647-2651.

Watson et al., "Clinical Evaluation of Single-Photon Attenuation Correction for 3D Whole-Body PET", IEEE Trans. on Nuc. Science, vol. 46, No. 4, Aug. 1999, pp. 1024-1031.

Watson et al., "Design and Performance of a Collimated Coincidence Point Sources for Simultaneous Transmission Measurements in 3-D PET", IEEE Transactions on Nuclear Science, vol. 48, No. 3, Jun. 2001, pp. 673-679.

\* cited by examiner

*Primary Examiner*—David P Porta
*Assistant Examiner*—Kiho Kim
(74) *Attorney, Agent, or Firm*—Peter L. Kendall (57) ABSTRACT

For patient transmission data acquired simultaneously with patient emission data, blank transmission data are acquired in the absence of the patient emission and therefore under count rate conditions different from the count rate conditions of the patient transmission data. To prevent the different count rate conditions from causing artifacts in reconstructed tomographic images, a correction is made for spatially varying count rate effects on the attenuation correction. For example, the blank scan data are adjusted according to the count rate at which the patient emission data are acquired, and the adjusted blank scan data and the patient transmission data are used for attenuation correction of the patient emission data used for reconstructing a tomographic image.

37 Claims, 8 Drawing Sheets

ATTENUATION CORRECTION FOR NUCLEAR MEDICAL IMAGING SCANNERS WITH SIMULTANEOUS TRANSMISSION AND EMISSION ACQUISITION

BACKGROUND OF THE INVENTION

1. Field of the Invention

The present invention relates generally to nuclear medical (NM) imaging such as such as positron emission tomography (PET) and single photon emission computed tomography (SPECT), and more particularly to attenuation correction of emission data simultaneously acquired with transmission data.

2. Description of the Background Art

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively.

Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

PET uses positron-emitting isotopes to label common biological compounds in order to study metabolic and physiologic functioning. The biological compounds are injected into a patient and become concentrated in certain locations of interest in a patient's body. Shortly after a positron is emitted by the radioactive isotope, the positron collides with an electron, causing the positron and the electron to annihilate each other. Annihilation of the positron and electron results in a pair of 511 keV gamma rays being emitted at the same time at approximately a 180° angle to each other. The patient is placed in a PET scanner to detect coincident emission of such gamma rays.

The PET scanner has an array of scintillation crystals and an array of photo-detectors for detecting when a gamma ray strikes a scintillation crystal. When two coincident gamma rays are detected, a record is made of the two scintillation crystals struck by the gamma rays. The two locations of the scintillation crystals define a line passing very close to the point of origin of the two gamma rays. A sufficient number of such coincident events are recorded in order to identify concentrations of the radioactive isotope in the patient. Digital image processing techniques permit the reconstruction of a three-dimensional image of the concentrations of the radioactive isotope in the patient.

For example, a commonly used positron-emitting isotope is Fluorine-18, which has a half-life about 110 minutes. The Fluorine-18 is produced in a cyclotron and is typically used to make Fluoro-deoxyglucose (FDG). FDG is a sugar that is metabolized by cells in the body. When FDG is injected into a patient, the FDG becomes distributed throughout the body in about an hour. The FDG, however, becomes more concentrated in parts of the body where the cells are more active. Since many cancers consist of very actively growing cells, the FDG becomes concentrated in such active cancers. When the patient is placed in the PET scanner, an image of the active cancers can be reconstructed from the coincident events recorded from the scanner. As described in Townsend et al. U.S. Pat. No. 6,490,476 issued Dec. 3, 2002, incorporated herein by reference, the PET scanner can be combined with an X-ray CT scanner in order to provide anatomical images from the CT scanner that are accurately co-registered with the functional images from the PET scanner without the use of external markers or internal landmarks.

Image reconstruction from recorded coincident events can be more precise if corrections are made for scatter and attenuation of the gamma rays while the gamma rays pass through the patient's body. To enable such corrections, a transmission scan of the patient is made simultaneous with the recording of coincident gamma rays emitted from the patient. See, for example, C J. Thompson, N. T. Ranger and A. C. Evans, "Simultaneous transmission and emission scans in positron emission tomography," IEEE Trans. Nuci. Sci., vol. 36, pp. 1011-1016, 1989; and C. C. Watson, W. F. Jones, T. Brun, K. Baker, K. Vaigneur, and J. Young, "Design and performance of a single photon transmission measurement for the ECAT ART," 1997 MIC Conf Rec., M9-02, pp. 1366-1370, 1998.

To make the transmission scan, the patient typically is irradiated by gamma rays from a Ge-68 (positron emitter) or Cs-137 (662 keV) point source. Recorded single gamma ray events presumed to originate from the point source are converted to an attenuation map of the patient. When a Cs-137 point source is used, the transmission data are scaled based on predetermined attenuation coefficients of the indicated class of body material; for example, for soft tissue or water, from a $\mu$-value of 0.086 cm$^{-1}$ at 662 keV to 0.095 cm$^{-1}$ at 511 keV. The attenuation map is used to correct the associated emission scan of the patient.

Typically the recording of the transmission scan simultaneous with the recording of the emission scan will cause emission contamination (EC) of the transmission data. The transmission data should be corrected for the emission contamination in order to avoid transmission image artifacts and underestimation of the reconstructed attenuation coefficients that in turn may result in incorrect attenuation and scatter coefficients.

Several methods for emission contamination correction are discussed in Hugo W. A. M. de Jong et al., "Correction for Emission Contamination in Transmission Scans for the High Resolution Research Tomograph," IEEE Transactions on Nuclear Science, Vol. 51, No. 3, June 2004, pp. 673-676. These methods include histogram based scaling, segmentation, and subtraction of an estimated EC-contribution from the transmission data prior to reconstruction.

Another method for emission contamination correction is a shifted mock scan, as described in M. Sibomana, et al., "Simultaneous measurement of transmission and emission contamination using a collimated $^{137}$Cs point source for the HRRT," Nuclear Science Symposium Conference Record, Vol. 4, IEEE, 16-22 October 2004, pp. 2647-2651. Emission contamination data are collected in a shifted mock scan simultaneous with the collection of transmission data during a transmission scan of a patient with a collimated gamma point source, the transmission data are corrected with the emission contamination data, and the corrected transmission data are used for attenuation correction of emission data for reconstruction of an emission image of the patient. A current technique for attenuation correction of emission data simultaneously acquired with transmission data involves the use of a blank scan taken when no object or activity is present in the scanner. Image reconstruction software (such as reconstruction tools by CPS Innovations of Knoxville, Tenn.) reconstructs an attenuation map and estimates attenuation coefficients from the blank scan data and the transmission scan data. The attenuation map and attenuation coefficients are used for correcting the emission data, and a tomographic image is reconstructed from the corrected emission data.

SUMMARY OF THE INVENTION

It has been observed that the quality of attenuation correction of nuclear imaging data is count rate dependent. For patient transmission data acquired simultaneously with patient emission data, the blank transmission data typically are acquired in the absence of the patient emission and therefore under count rate conditions different from the count rate conditions of the patient transmission data. For high-sensitivity, high-resolution PET scanners, the different count rate conditions cause spatially varying effects seen in the tomographic images as ring artifacts in the transaxial views and banding in the axial views. It has been discovered that these artifacts can be suppressed by correcting for these spatially varying count rate effects on the attenuation correction of the patient emission data.

Therefore, in accordance with a basic aspect, the invention provides a method of nuclear medical imaging wherein gamma events are detected by gamma detectors of a scanner. The method includes simultaneously acquiring patient emission data and patient transmission data of gamma events detected by the gamma detectors of the scanner, the patient emission data resulting from radioisotope in a patient, and the patient transmission data resulting from radiation from a transmission source external to the patient including radiation passing through the patient. The method also includes using the patient transmission data for attenuation correction of the patient emission data, and using the attenuation corrected patient emission data for producing a tomographic image from the patient. The method further includes correcting for spatially varying count rate effects on the attenuation correction.

In accordance with another aspect, the invention provides a method of nuclear medical imaging wherein gamma events are detected by gamma detectors of a scanner. The method includes acquiring blank transmission data of gamma events detected by the gamma detectors when a patient is absent from the scanner. The method also includes simultaneously acquiring patient emission data and patient transmission data of gamma events detected by the gamma detectors, the patient emission data resulting from radioisotope in a patient, and the patient transmission data resulting from radiation from a transmission source external to the patient including radiation passing through the patient.

The method further includes adjusting the blank scan data according to a count rate at which the patient emission data are obtained from the gamma detectors, using the adjusted blank scan data and the patient transmission data for attenuation correction of the patient emission data, and using the attenuation corrected patient emission data for producing a tomographic image from the patient.

In accordance with yet another aspect, the invention provides a nuclear medical imaging system including a scanner including gamma detectors mounted for being circumferentially disposed about a patient, and a transmission source mounted for transmission scanning of the patient. The system also includes at least one data processor coupled to the gamma detectors and programmed for simultaneously acquiring patient emission data and patient transmission data of gamma events detected by the gamma detectors, the patient emission data resulting from radioisotope in the patient, and the patient transmission data resulting from radiation from the transmission source including radiation passing through the patient. The at least one data processor is also programmed for using the patient transmission data for attenuation correction of the patient emission data, and using the attenuation corrected patient emission data for producing a tomographic image from the patient. The at least one data processor is further programmed for correcting for spatially varying count rate effects on the attenuation correction.

In accordance with still another aspect, the invention provides a system for nuclear medical imaging including a scanner having gamma detectors mounted for being circumferentially disposed about a patient, and a transmission source mounted for transmission scanning of the patient. The system also includes at least one data processor coupled to the gamma detectors and programmed for acquiring blank transmission data of gamma events detected by the gamma detectors when a patient is absent from the scanner, and simultaneously acquiring patient emission data and patient transmission data of gamma events detected by the gamma detectors, the patient emission data resulting from radioisotope in a patient, and the patient transmission data resulting from radiation from a transmission source external to the patient including radiation passing through the patient.

The at least one data processor is also programmed for adjusting the blank scan data according to a count rate at which the patient emission data are obtained from the gamma detectors, using the adjusted blank scan data and the patient transmission data for attenuation correction of the patient emission data, and using the attenuation corrected patient emission data for producing a tomographic image from the patient.

DETAILED DESCRIPTION OF THE PREFERRED EMBODIMENTS

Figure 1:
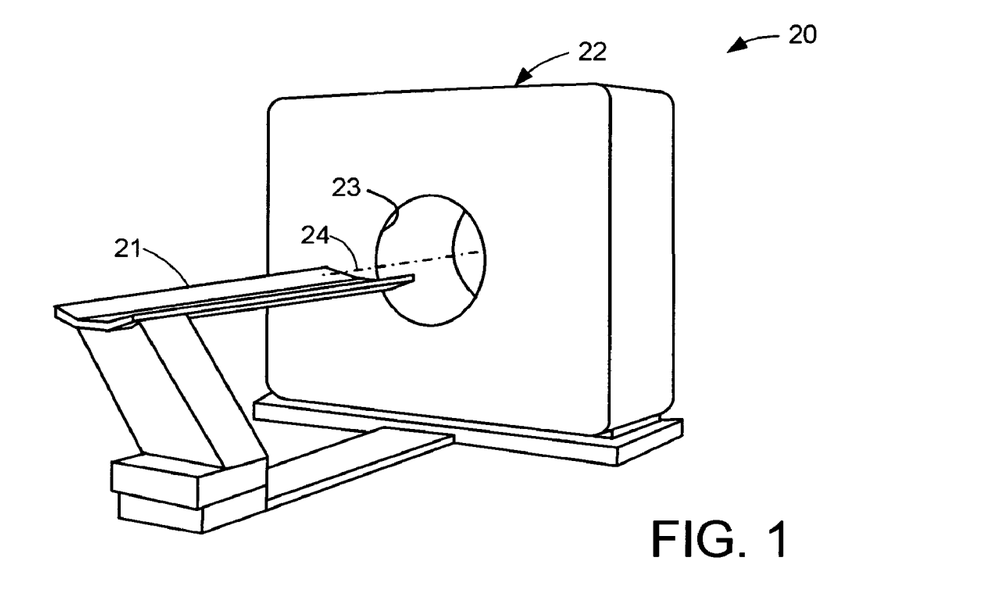
FIG. 1 is a perspective view of scanner for nuclear medical imaging.

With reference to FIG. 1, there is shown a positron emission tomographic (PET) scanner generally designated 20. The scanner 20 includes a bed 21 for supporting a human patient (25 in FIG. 2) and a scanner assembly 22 having a cylindrical hole or tunnel 23 for receiving the patent. The bed 21 is aligned along an axis 24 of the tunnel 23 and is translated relative to the scanner assembly along this axial direction for scanning of the whole body of the patient.

Figure 2:
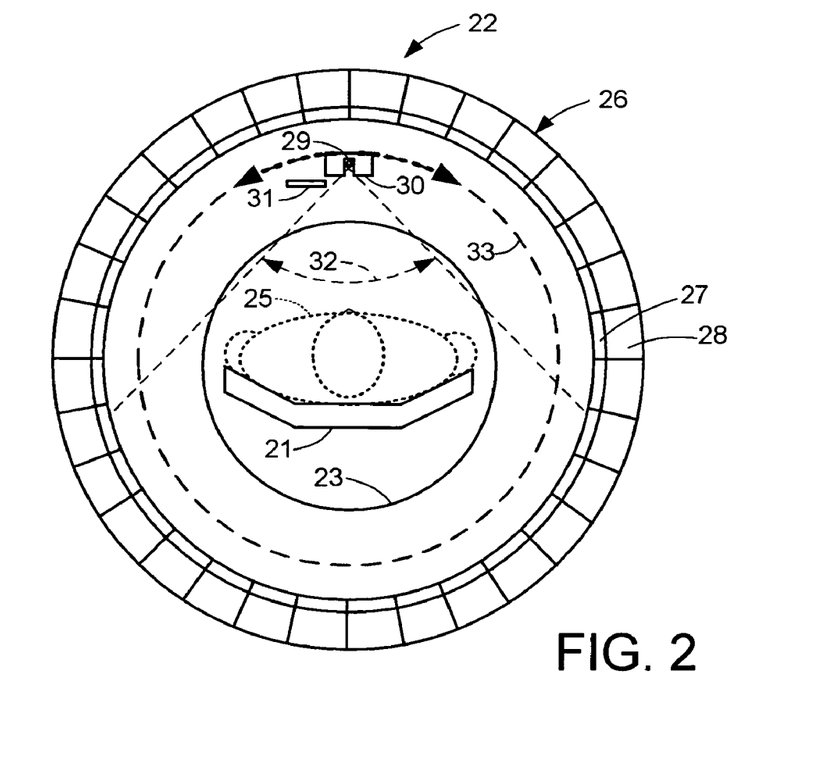
FIG. 2 shows an axial view of a gamma point source and detector array used in the scanner of FIG. 1 for a whole-body transmission or emission scan of a human patient.

As further shown in FIG. 2, when the patient 25 is received in the tunnel 23, the patient is surrounded by a gamma detector array 26 including panels of scintillating crystals 27 and photo-detectors 28. The scintillating crystals, for example, are made of Lutetium oxyorthosilicate (LSO) and are arranged in a cylindrical array having a spacing of about 4 mm between the centers of adjacent crystals in the axial and trans-axial directions. The photo-detectors, for example, are photomultiplier tubes or photodiodes. An 8×11 array of the photomultiplier tubes, for example, senses light from a corresponding 90×120 array of scintillation crystals.

Circuitry responsive to the photomultiplier tubes can detect when a particular one of the crystals is struck by a gamma photon and identify the particular crystal struck by the gamma photon.

Typically the scintillation crystals and the photodetectors are arranged as a ring of modules surrounding the tunnel 23. As further shown in FIG. 2, the scanner assembly 22 includes a gamma point source 29 mounted in a collimator 30 for transmission scanning of the patient. The point source 29, for example, includes a Ge-68 emitter of positrons that are annihilated to produce 511 keV gamma pairs, or preferably a Cs-137 emitter of 662 keV gamma rays. The collimator 30 has a relatively wide field of view 32 in the trans-axial direction so as to illuminate an entire trans-axial cross-section of the patient 25 when the body of the patient 25 fills the tunnel 23 of the scanner assembly 22 and a cover 31 is removed from the collimator. In order to uniformly illuminate the patient's body from all trans-axial directions, the collimator 30 is driven along a circumferential path 33 about the patient 25. Preferably the transmission scanning of the patient and the recording of "single" gamma events resulting from the gamma point source 29 is done simultaneous with the detection and recording of near simultaneous "double" gamma events resulting from pairs of gamma photons emitted by the patient due to the positron-emitting radioisotope that has been injected into the patient.

Figure 3:
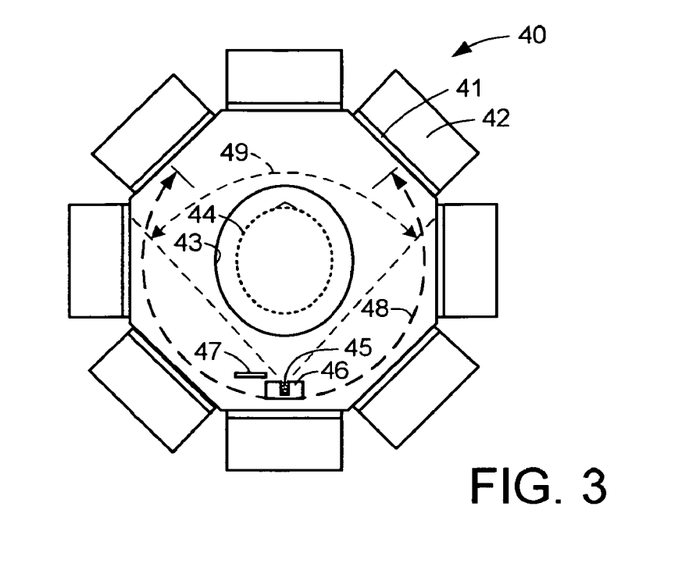
FIG. 3 shows an axial view of a gamma point source and detector array used for the transmission or emission scan of the head of a human patient.

FIG. 3 shows an alternative arrangement of a scanner assembly 40 especially adapted for scanning of the head of a patient 44. In this case, the scanner assembly 40 has a smaller central hole 43 that is sized to receive a human head. The scanner assembly 40 has eight flat gamma detector panels, each including a rectangular array 41 of scintillation crystals and a corresponding array 42 of photo-detectors. As shown, for example, the scanner assembly includes an octagonal arrangement of eight gamma detector flat panels, and each flat panel includes an array of 10,800 LSO scintillation crystals (with a spacing of about 2.2 mm between adjacent crystals in the axial and trans-axial directions) and a corresponding array of 88 photo-multiplier tubes.

For transmission scanning, the scanner assembly 40 further includes a 30 mCi (1110 MBq) Cs-137 point source emitter 45 of 662 keV gamma rays. The Cs-137 point source emitter 45 is disposed in a collimator 56. During transmission scanning, a cover 47 is removed from the collimator 56 and the point source and collimator are swung over a 270 degree arc 48 for illumination of the head 44 of the patient. The collimator has a relatively wide trans-axial beamwidth 49 so that the point source 45 illuminates an entire trans-axial cross-section of the head of the patient 44 regardless of the position of the point source along the arc 48.

Figure 4:
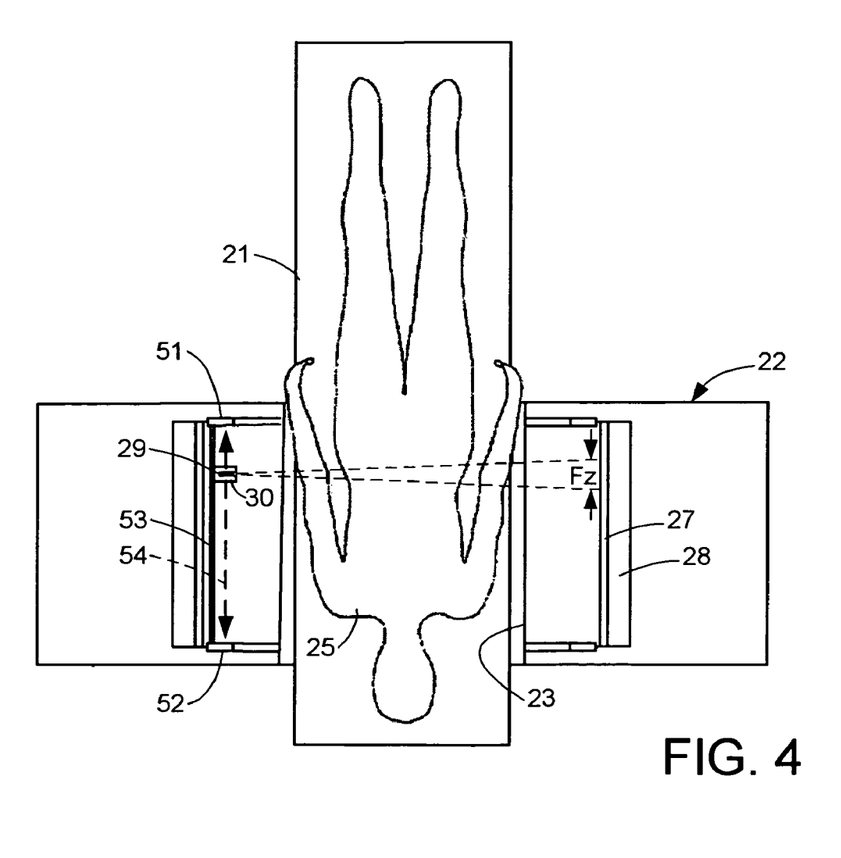
FIG. 4 shows a trans-axial top view of a transmission scan of a human patient using the scanner of FIG. 1.

FIG. 4 shows a trans-axial top view of the scanner 20 of FIG. 1 during a transmission scan of the human patient 25. In order to revolve the point source 29 and collimator 30 about the patient 25, the collimator is mounted to a pair of rings 51, 52 that are axially spaced at opposite ends of the scanner assembly 22, and the rings 52, 52 are mounted for rotation about the central axis (24 in FIG. 1). The collimator 30 is mounted for axial translation along a rail 53 spanning the two rings 51, 52. The collimator 30 has a rather narrow beamwidth "Fz" along the axial direction over the opposite scintillation crystal array 27. For example, the beamwidth "Fz" at the scintillation crystal array 27 is much smaller than one-half of the axial length of the field-of-view (FOV) of the scintillation crystal array 27.

Figure 5:
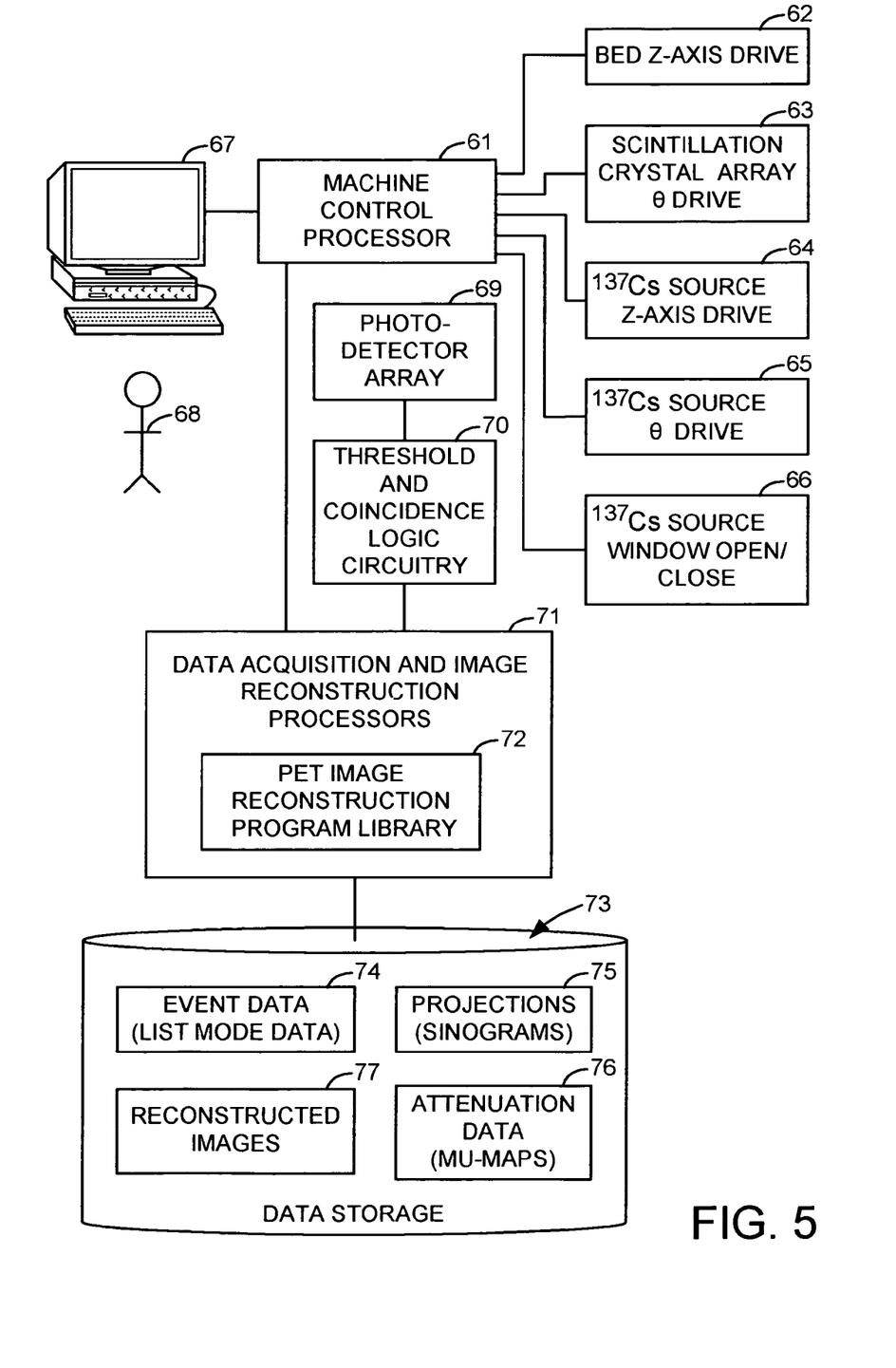
FIG. 5 is a block diagram of a system for nuclear medical imaging using the scanner of FIG. 1.

FIG. 5 shows a system for nuclear medical imaging using the scanner of FIG. 1. The system includes a machine control processor 61 for controlling various electro-mechanical drives of the bed and scanner assembly of the scanner of FIG. 1. These drives include a bed Z-axis drive 62 for translating the bed along the z-axis relative to the scanner assembly, a scintillation crystal array θ drive 63 for adjusting the orientation of the scintillation crystal array around the Z-axis, a Cs-137 source Z-axis drive 64 for translating the gamma point source along the axial direction (as shown in FIG. 4), a Cs-137 source θ drive for revolving the gamma point source in the circumferential direction around the z-axis as shown in FIG. 2, and an actuator 66 for opening and closing the window of the gamma point source. The machine control processor 61 is linked to a terminal 67 of an operator 68 to provide a graphical user interface for receiving commands and displaying reconstructed PET images of the patient.

The machine control processor 61 is also linked to one or more data acquisition and image reconstruction processors 71. Signals from the photo-detector array 69 (including, for example, the photo-detectors 28 in FIG. 2), are received by threshold and coincidence logic circuitry 70. The threshold and coincidence logic circuitry detect and discriminate between single gamma events above an energy threshold, and double gamma events above an energy threshold and coincident within a certain duration of time. In response to detection of a single gamma event, the circuitry 70 transmits to the processors 71 the coordinate indices of the scintillation crystal having been struck by the single gamma photon. In response detection of a double gamma event, the circuitry 70 transmits to the processors 71 the coordinate indices of each of the two scintillation crystals being struck by the coincident gamma photons.

At least one of the data acquisition and image reconstruction processors 71 is programmed for responding to the circuitry 70 for recording in data storage 73 the detected single and/or double gamma events. Preferably the event data 74 are recorded in list mode. Such list mode data 74 are in the form of a list of the events ordered by the time at which each event is detected. This list mode permits the relevant data to be quickly written to the data storage 73 by one of the processors 71 for pipelined processing by other ones of the processors 71 at a later time. The pipelined processing is done by executing programs in a PET image reconstruction program library 72, and includes sorting and binning of the event data into projections 75 such as sinograms, producing attenuation data such as mu-maps from single events recorded during transmission scanning, correcting of the sinogram data of double events for randoms, detector sensitivity, scatter, and attenuation, and producing reconstructed images 77 from the corrected sinogram data of the double events. This pipelined processing typically is done by sequential execution of the programs in the program library 72, although the execution of each program in the sequence could be done in parallel by multiple ones of the processors 71. In a clinical setting, the PET images for a first patient could be reconstructed concurrently with the recording of event data for a second patient.

For a commercial medical image scanner, the program library 72 is typically supplied by the manufacturer of the scanner. For a research scanner, the program library 72 is often available to a registered user group. Moreover, a public domain program library called the "STIR open source reconstruction library" is available from the Internet at stir.irls.org.

Figure 6:
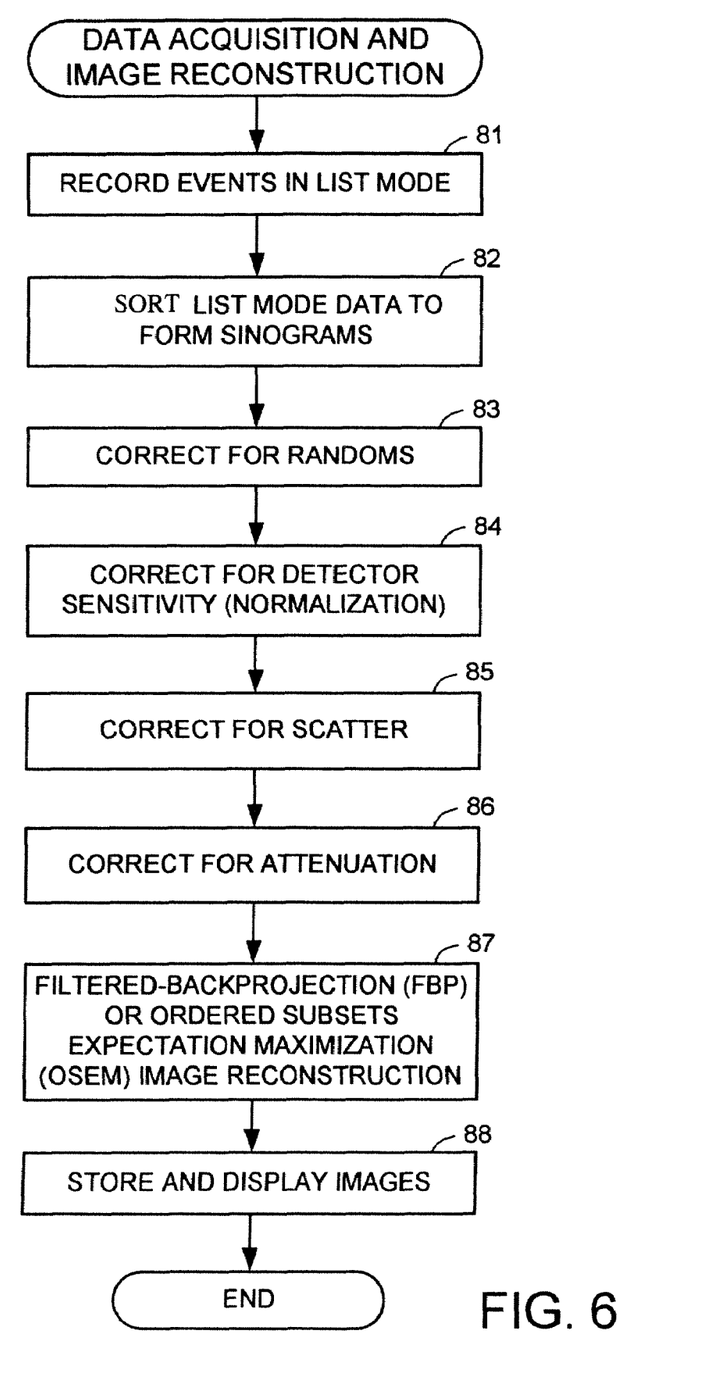
FIG. 6 is a flowchart of a procedure for data acquisition and image reconstruction in the system of FIG. 5.

FIG. 6 shows the general sequence of the event data acquisition and image reconstruction in the system of FIG. 5. In a first step 81 of FIG. 6, event data are obtained by scanning a patient and recording the event data in list mode. Next, in step 82, the list mode data are sorted, for example, to form sinograms. In step 83, the projected data are corrected for randoms. In step 84, the projected data are corrected (i.e., normalized) for detector sensitivity. In step 85, the projected data are corrected for scatter. In step 86, the projected data are corrected for attenuation. In step 87, images are reconstructed from the projected data, for example by a process of filtered-backprojection (FBP) or a process of ordered subsets expectation maximization (OSEM). Finally, in step 88, the reconstructed images are stored and displayed, for example, during the diagnosis and treatment of the patient for a disease such as cancer.

The present invention more particularly concerns the correction of the patient emission data for attenuation in step 86 of FIG. 6. Although there are various techniques for attenuation correction, many of them involve the use of a blank transmission scan taken when no object or activity is present in the scanner, followed by a patient transmission scan simultaneous with a patient emission scan. The blank transmission data are used to correct the patient transmission data, and the corrected patient transmission data are used for the attenuation correction of the patient emission data. In this case, the blank transmission data are acquired under significantly lower count rate conditions than the patient transmission data and the patient emission data so that there will be spatially varying effects seen in the tomographic images unless the data processing includes correcting for spatially varying count rate effects on the attenuation correction.

For the case of attenuation correction of patient emission data using blank transmission data and patient transmission data acquired simultaneous with the patient emission data, the preferred way of correcting for the spatially varying count rate effects on the attenuation correction is to apply a count rate and position dependent correction factor $BF(r,\theta,z,S_{patient})$ to the blank scan transmission data, and to use this corrected blank scan data for the correction of the patient transmission data. The count rate $S_{patient}$ is the single count rate of the simultaneous patient transmission and patient emission scans because it is desired to convert the blank transmission data taken under the significantly lower count rate conditions to what they would otherwise be if taken under significantly higher count rate conditions. This conversion can be substantially independent of the count rate conditions of acquisition of the blank transmission data by using the same blank transmission source and the same transmission scan path and duration so that in effect the blank transmission scan and the blank patient scan are taken under the same conditions except for the attenuation and scatter due to the presence of the patient and the suppression of detected patient transmission gamma events due to the detection of patient emission gamma events. The attenuation and scatter due to the presence of the patient are desired differences, and the suppression of the detected patient transmission gamma events is the difference to be corrected for by the factor $BF(r,\theta,z,S_{patient})$.

For a transmission source (e.g., 29 in FIG. 2 or 45 in FIG. 3) causing single gamma events to be detected, the count rate $S_{patient}$ preferably is the total single count rate for the patient scan (i.e., the total number of gamma events detected by all of the gamma detectors of the scanner over the duration of the scan). Singles count rate correction also could be based on ring or block measurements, in which case the correction factor BF could be a function of the respective singles count rates over multiple regions of the detector array. However, a count rate and position dependent correction factor $BF(r,\theta,S_{patient})$ could be used that is a function of a different kind of gamma count rate.

Figure 7:
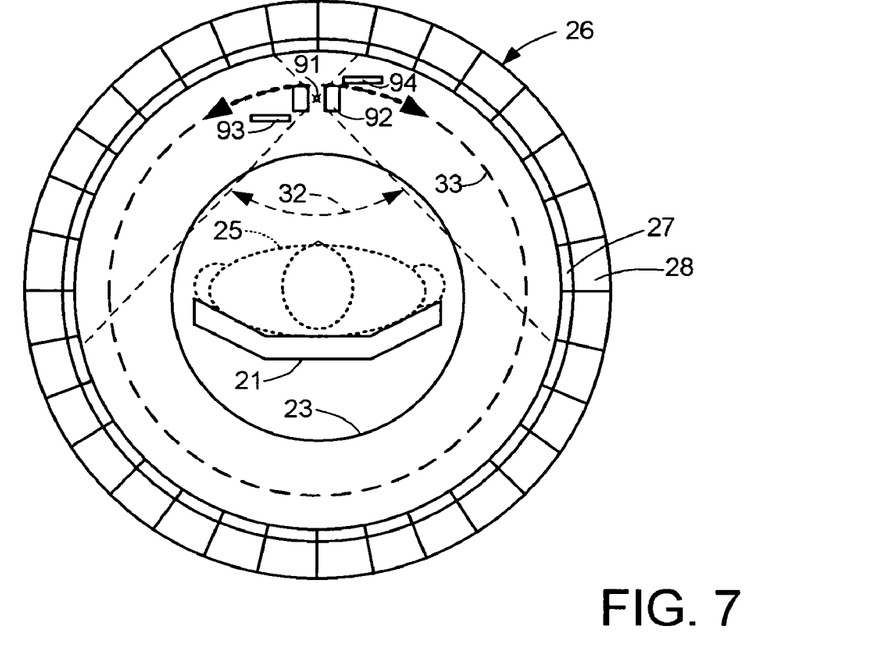
FIG. 7 shows the replacement of the transmission point source of FIG. 2 with a coincidence collimated transmission point source.

FIG. 7, for example, shows that the transmission source 29 of FIG. 2 has been replaced with a so-called coincidence collimated transmission point source 91 configured with a collimator 92 providing a pair of gamma beams in opposite directions when the source 91 is exposed by opening a pair of windows 93 and 94. Such a coincidence collimated transmission point source 91 uses a positron emitting radioisotope such as Ge-68 so that near-simultaneous pairs of gamma photons issue from the source 91 in opposite directions approximately collinear with a line of response passing close to the source 91. Transmission scan data from such a source 91 is obtained by binning double gamma events having a line of response passing very close to the location of the source 91 when the double event is detected. Such doubles, however, could also result from so-called "randoms," which occur when two uncorrelated singles are detected to occur within the duration of the coincidence window of the coincidence logic circuitry (70 in FIG. 5.). Therefore, for correcting the transmission data from a coincidence collimated point source, the random event rate can be used instead of the single rate.

The random event data provide single rate estimates for each radial, angular, and axial coordinate of the transmission sinogram. The random event rate is proportional to the product of single rates in the detector array, linked directly to the sinogram. The advantage of using the random rate is that it provides more detailed information. However, the single rate also can be used for correcting transmission data from a coincidence collimated transmission point source by using a correction factor function BF that is responsive to the square of the single rate. For example, the correction factor can be at least a second order polynomial function of the single rate. Such a correction factor function can be used regardless of whether the transmission source is coincidence collimated.

For a transmission source that is or is not coincidence collimated, the correction factor function BF can be a second order polynomial of the single rate as follows:

$$BF(r, z, \theta, S) = a_0(r, z, \theta) + a_1(r, z, \theta)S + a_2(r, z, \theta)S^2.$$

Figure 8:
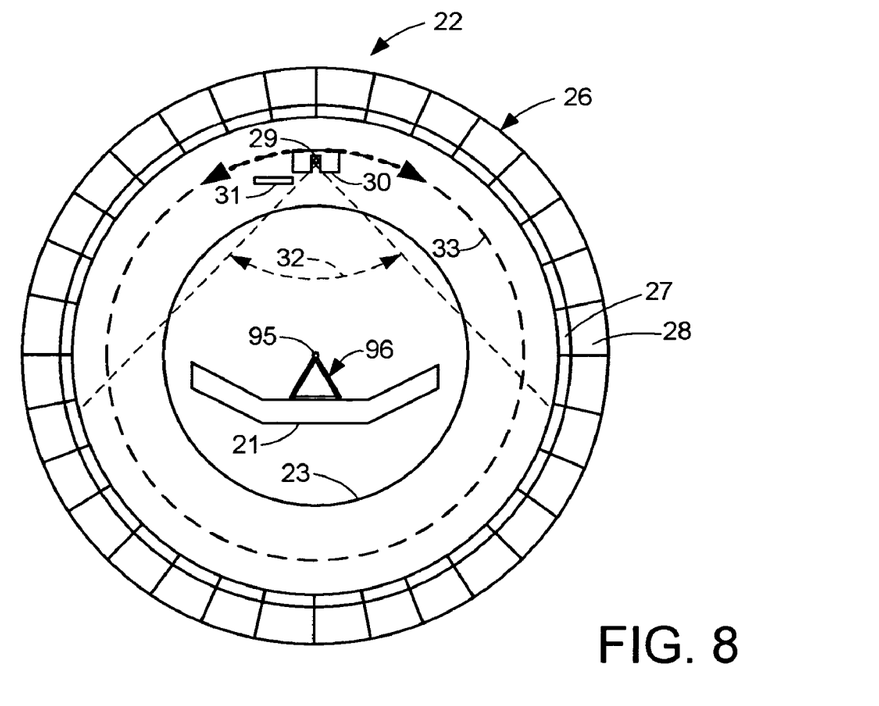
FIG. 8 shows an axial view of a line emission source co-axially aligned in the scanner tunnel.

In practice, the correction factor function is obtained by fitting the polynomial to pseudo blank data obtained by transmission scanning of a line emission source 95 that is axially disposed in the center of the scanner tunnel 23, as shown in FIG. 8. For example, the line emission source 95 is a rigid plastic tube filled with F-18 and sealed at its ends. The plastic tube has a 2 mm inner diameter and a length of about the axial field of view (FOV) of the scanner (e.g., a length of 70 cm). The plastic tube 95, for example, is mounted on the patient bed 21 by a light-weight triangular support 96 of cardboard sheets or rigid polystyrene foam sheets so that the plastic tube extends along the central axis of the tunnel 23.

The main goal behind the construction of the line emission source is for the line emission source to be virtually invisible in the transmission scan. Thus, the line emission source can be constructed in various ways.

The line emission source activity range may vary, and be dimensioned to the count rate capability of the scanner.

For example, at least one frame of the scan of the emission source should have a total scanner single rate of at least the total scanner single rate that will be recorded for a patient scan but no more than the count rate capability of the scanner.

Figure 9:
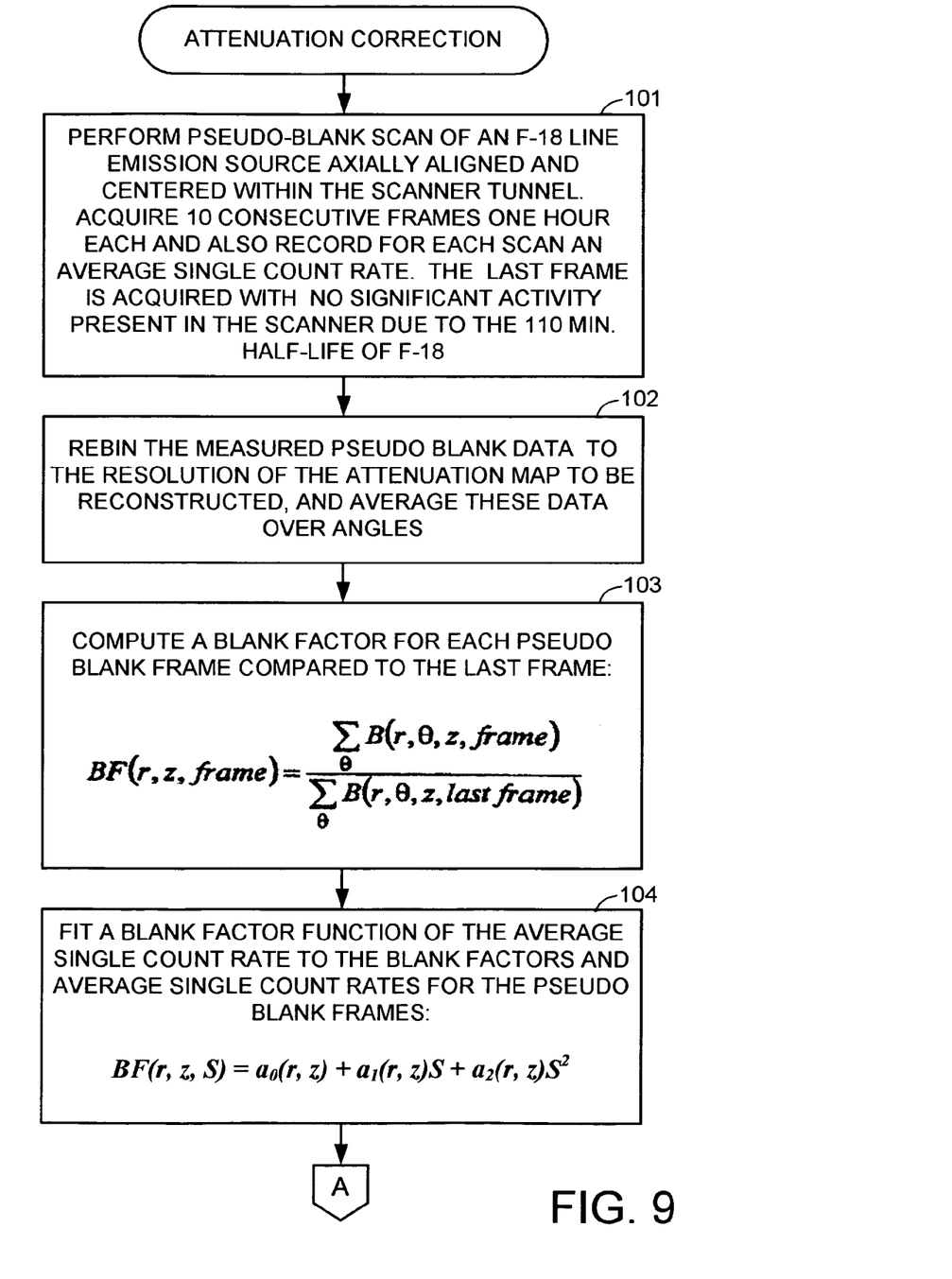
FIGS. 9-11 show a flowchart of an example of attenuation correction in accordance with the invention.
Figure 10:
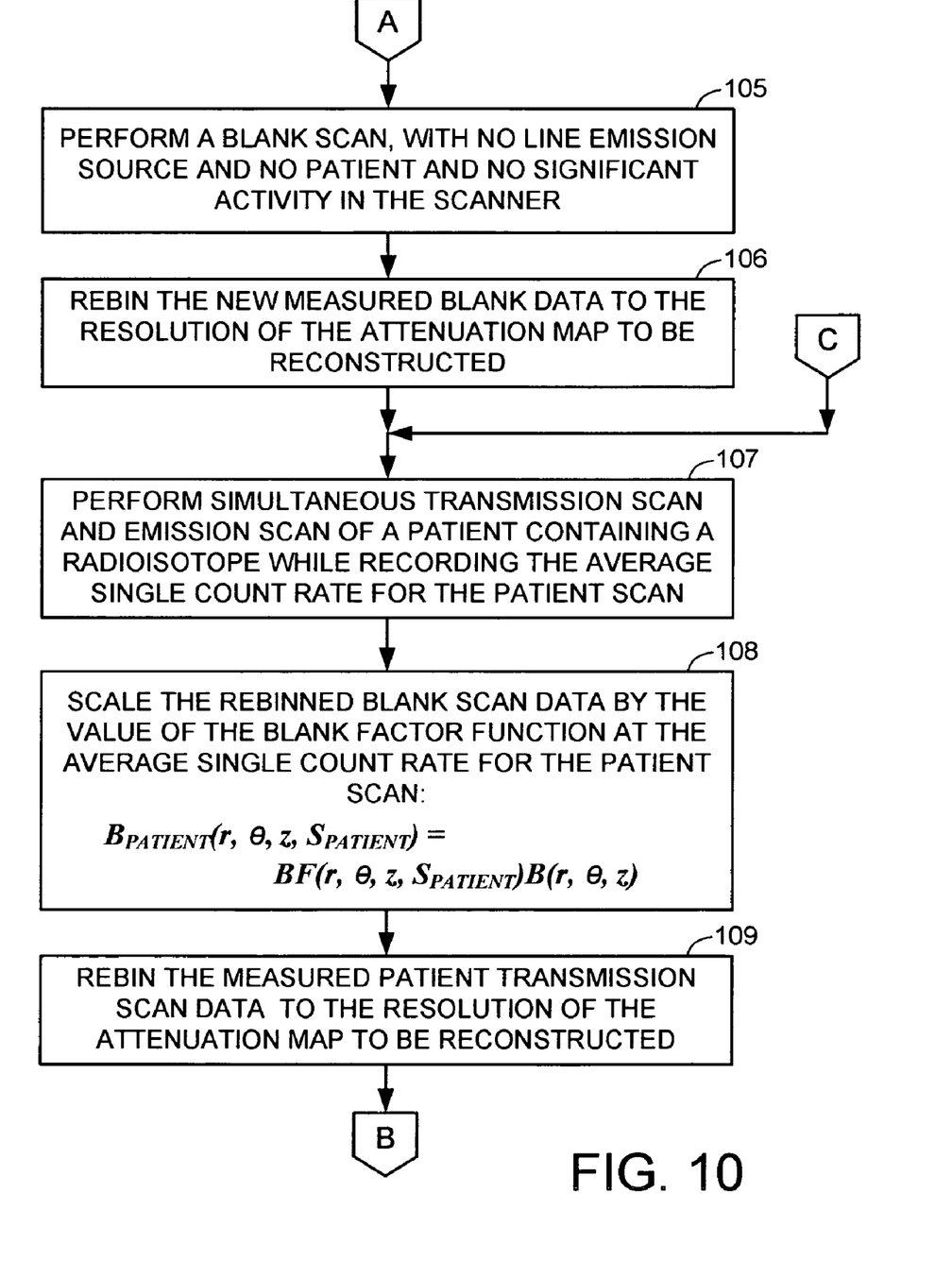
Figure 11:
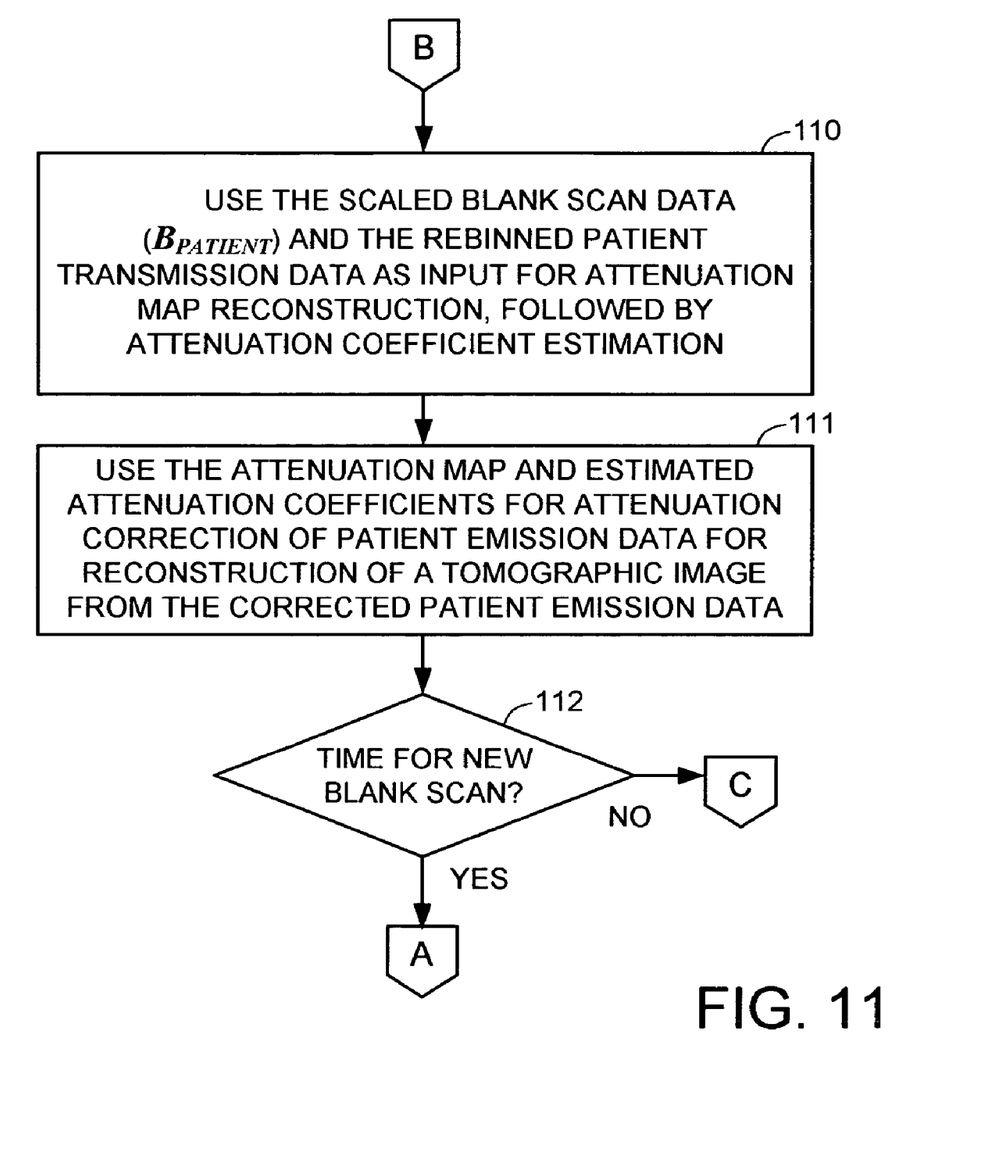

FIGS. 9-11 show a specific example of attenuation correction in accordance with the invention. In a first step 101 of FIG. 8, the PET scanner of FIG. 1 is operated to perform a pseudo-blank scan of the F-18 line emission source axially aligned and centered within the scanner tunnel. The scan is repeated over several frames in which the source has different levels of activity. For example, ten consecutive frames of one hour each are acquired, and an average single count rate over the scanner array is also acquired for each frame. The last frame is acquired with no significant activity due to the 110 minute half-life of the F-18. Next, in step 102, the measured pseudo blank data are rebinned to the resolution of the attenuation map to be reconstructed. In order to significantly improve statistics, these pseudo blank data are also averaged over angles.

In step 103, a blank factor BF for each of the frames of pseudo-blank data (and for each combination of possible radial and axial coordinates at the resolution of the attenuation map) is computed by dividing the value at each possible coordinate combination for the respective pseudo blank frame by the value for the same possible coordinate combination for the last pseudo blank frame.

In step 104, a blank factor function of the average single count rate is fitted to the blank factors and average single count rates for the pseudo blank frames. In this example, the blank factor function is a second-order polynomial specified by three respective constants ($a_0$, $a_1$, $a_2$) for each possible combination of radial and axial coordinates at the resolution of the attenuation map. Thus, step 104 involves fitting second-order polynomials to data points, for example, by repetitively calling a least-squares curve fitting routine. Such a routine is typically found in a math library for a compiler of a high-level program language. For example, the Free Software Foundation at "gnu.org" provides such a routine called "gsl.fit" in its GNU scientific C program library published at "gnu.org", and an example of using "gsl.fit" for fitting data points to a second-order polynomial is given in a gsl reference manual in a chapter entitled "least squares fitting" also published at "gnu.org". From step 104, execution continues to step 105 in FIG. 9.

In step 105, the PET scanner of FIG. 1 is used to perform a blank scan, with no line emission source and no patient and no significant activity in the scanner. In step 106, the new measured blank data are rebinned to the resolution of the attenuation map to be reconstructed. If the line emission source used in step 101 is sufficiently transparent to the transmission scan, it would be possible to use the last frame of pseudo blank data from step 101 as blank scan data so that steps 105 and 106 could be skipped. An alternative simplification would be to use data from a blank scan as in steps 105 and 106 in lieu of a last frame of pseudo blank data in the computation of a blank factor for each pseudo blank frame.

In step 107, the PET scanner of FIG. 1 is used to perform a simultaneous transmission scan and emission scan of a patient containing a radioisotope while recording the average single count rate of the patient scan. In step 108, the rebinned blank scan data (is scaled by the value of the blank factor function at the average single count rate for the patient scan. In step 109, the measured patient transmission scan data are rebinned to the resolution of the attenuation map to be reconstructed. Execution continues from step 109 to step 110 in FIG. 11.

In step 110 of FIG. 11, the scaled blank scan data and the rebinned patient transmission data are used as input for attenuation map reconstruction, followed by attenuation coefficient estimation. In step 111, the attenuation map and estimated attenuation coefficients are used for attenuation correction of patient emission data for reconstruction of a tomographic image from the corrected patient emission data, as described above with reference to steps 86 and 87 of FIG. 6. From step 111, execution continues to step 112.

In step 112, if it is not time to perform a new blank scan, then execution loops back to step 107 of FIG. 10 to perform another patient scan, for example, to scan another patient. The same blank scan data can be used for correction of multiple patient scans so long as there is no significant change in the activity of the transmission point source or the configuration of the scanner assembly. If there has been sufficient time since the last blank scan for there to be a significant change in activity of the transmission point source or if there has been a significant change in the configuration of the scanner assembly, then execution loops back from step 112 to step 105 to perform a new blank scan. Thus, the same blank factor function fitted to the same pseudo-blank scan data can be used for correcting a number of subsequent blank scans for attenuation correction of even more patient emission scans. The pseudo blank scan and fitting of the blank factor function to the pseudo blank data need only be repeated when there has been a substantial change in the activity of the transmission point source or in the configuration of the scanner assembly.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A method of nuclear medical imaging wherein gamma events are detected by gamma detectors of a scanner, said method comprising:

simultaneously acquiring patient emission data and patient transmission data of gamma events detected by the gamma detectors, the patient emission data resulting from radioisotope in a patient, and the patient transmission data resulting from radiation from a transmission source external to the patient including radiation passing through the patient;

using the patient transmission data for attenuation correction of the patient emission data;

using the attenuation corrected patient emission data for producing a tomographic image from the patient, wherein the method further includes correcting for spatially varying count rate effects on the attenuation correction; and acquiring blank transmission data from the gamma detectors when the patient is absent from the scanner, and using the blank transmission data for the attenuation correction of the patient emission data, wherein the correcting for spatially varying count rate effects on the attenuation correction includes adjusting the blank scan data according to count rate at which the patient emission data are obtained from the gamma detectors.

2. The method as claimed in claim 1, which further includes obtaining measurements of a relation between attenuation correction and count rate, and using the measurements of the relationship between attenuation correction and count rate for the correcting for the spatially varying count rate effects on the attenuation correction.

3. The method as claimed in claim 2, wherein the measurements of a relation between attenuation correction and count rate are obtained by acquiring pseudo blank transmission data from the gamma detectors when the patient is absent from the scanner and a line emission source is axially disposed in the scanner.

4. The method as claimed in claim 1, wherein the blank transmission data are used for the attenuation correction of the patient emission data by
reconstructing an attenuation map and estimating attenuation coefficients using the blank transmission data and the patient transmission data; and
using the attenuation map and estimation of attenuation coefficients for the attenuation correction of the patient emission data.

5. The method as claimed in claim 1, which further includes an initial step of obtaining measurements of a relation between the blank transmission attenuation correction and a count rate, and wherein the measurements of the relationship between attenuation correction and the count rate are used for adjusting the blank scan data according to the count rate at which the patient emission data are obtained from the gamma detectors.

6. The method as claimed in claim 5, wherein the measurements of the relation between the blank transmission attenuation correction and the count rate are obtained by acquiring pseudo blank transmission data from the gamma detectors when the patient is absent from the scanner and a line emission source is axially disposed in the scanner.

7. The method as claimed in claim 6, which includes acquiring successive frames of the pseudo blank transmission data, and fitting the successive frames of the pseudo blank transmission data to a function of a total scanner count rate for each frame in order to obtain a blank scan correction factor as a function of the total scanner count rate, and wherein the blank scan correction factor as a function of the total scanner count rate is used for the adjusting of the blank scan data according to the count rate at which the patient emission data are obtained from the gamma detectors.

8. The method as claimed in claim 7, wherein the total scanner count rate is a total scanner single count rate.

9. The method as claimed in claim 7, wherein the scanner has a coincidence collimated transmission point source system, and the total scanner count rate is a total scanner random count rate.

10. The method as claimed in claim 1, which includes correcting for spatially varying count rate effects on the attenuation correction by applying a correction function that is a function of position with respect to the scanner, and that is a non-linear function of a count rate at which the patient emission data are obtained from the gamma detectors.

11. A method of nuclear medical imaging wherein gamma events are detected by gamma detectors of a scanner, said method comprising:
acquiring blank transmission data of gamma events detected by the gamma detectors when a patient is absent from the scanner, and simultaneously acquiring patient emission data and patient transmission data of gamma events detected by the gamma detectors, the patient emission data resulting from radioisotope in a patient, and the patient transmission data resulting from radiation from a transmission source external to the patient including radiation passing through the patient;
adjusting the blank scan data according to count rate at which the patient emission data are obtained from the gamma detectors;
using the adjusted blank scan data and the patient transmission data for attenuation correction of the patient emission data; and
using the attenuation corrected patient emission data for producing a tomographic image from the patient.

12. The method as claimed in claim 11, wherein the adjusted blank transmission data and the patient transmission data are used for the attenuation correction of the patient emission data by
reconstructing an attenuation map and estimating attenuation coefficients using the adjusted blank transmission data and the patient transmission data, and
using the attenuation map and estimation of attenuation coefficients for the attenuation correction of the patient emission data.

13. The method as claimed in claim 11, wherein the method further includes obtaining measurements of a relation between the blank transmission data and a total scan count rate, and using the measurements of the relation between the blank transmission data and the total scan count rate for adjusting the blank scan data according to the total scan count rate at which the patient emission data are obtained from the gamma detectors.

14. The method as claimed in claim 13, wherein the measurements of the relation between the blank transmission attenuation correction and the count rate are obtained by acquiring pseudo blank transmission data from the gamma detectors when the patient is absent from the scanner and a line emission source is axially disposed in the scanner.

15. The method as claimed in claim 14, which includes acquiring successive frames of the pseudo blank transmission data, and fitting the successive frames of the pseudo blank transmission data to a function of a total scanner count rate for each frame in order to obtain a blank scan correction factor as a function of the total scanner count rate, and wherein the blank scan correction factor as a function of the total scanner count rate is used for the adjusting of the blank scan data according to the count rate at which the patient emission data are obtained from the gamma detectors.

16. The method as claimed in claim 15, wherein the total scanner count rate is a total scanner single count rate.

17. The method as claimed in claim 15, wherein the scanner has a coincidence collimated transmission point source system, and the total scanner count rate is a total scanner random count rate.

18. The method as claimed in claim 15, wherein successive frames of the pseudo blank transmission data are obtained from the same line emission source over successive time intervals while the line emission source decreases in activity.

19. The method as claimed in claim 11, wherein the blank scan data are adjusted by a correction function that is a function of axial, radial, and angular position with respect to the scanner, and that is a non-linear function of the count rate at which the patient emission data are obtained from the gamma detectors.

20. A nuclear medical imaging system comprising:
a scanner including gamma detectors mounted for being circumferentially disposed about a patient, and a transmission source mounted for transmission scanning of the patient, and
at least one data processor coupled to the gamma detectors and programmed for simultaneously acquiring patient emission data and patient transmission data of gamma events detected by the gamma detectors, the patient emission data resulting from radioisotope in the patient, and the patient transmission data resulting from radiation from the transmission source including radiation passing through the patient, wherein said at least one data processor is also programmed for using the patient transmission data for attenuation correction of the patient emission data, and using the attenuation corrected patient emission data for producing a tomographic image from the patient, wherein said at least one data processor is further programmed for correcting for spatially varying count rate effects on the attenuation correction, wherein said at least one processor is programmed for acquiring blank transmission data from the gamma detectors when the patient is absent from the scanner, and using the blank transmission data for the attenuation correction of the patient emission data, and wherein said at least one processor is programmed for correcting for spatially varying count rate effects on the attenuation correction by adjusting the blank scan data according to a count rate at which the patient emission data are obtained from the gamma detectors.

21. The system as claimed in claim 20, wherein said at least one processor is programmed for obtaining measurements of a relation between attenuation correction and count rate, and using the measurements of the relationship between attenuation correction and count rate for the correcting for spatially varying count rate effects on the attenuation correction.

22. The system as claimed in claim 21, wherein the measurements of a relation between attenuation correction and count rate are obtained by acquiring pseudo blank transmission data from the gamma detectors when the patient is absent from the scanner and a line emission source is axially disposed in the scanner.

23. The system as claimed in claim 20, wherein said at least one processor is programmed for using the blank transmission data for the attenuation correction of the patient emission data by reconstructing an attenuation map and estimating attenuation coefficients using the blank transmission data and the patient transmission data; and using the attenuation map and estimation of attenuation coefficients for the attenuation correction of the patient emission data.

24. The system as claimed in claim 20, wherein said at least one processor is further programmed for obtaining measurements of a relation between the blank transmission attenuation correction and a count rate, and using the measurements of the relationship between attenuation correction and the count rate for adjusting the blank scan data according to the count rate at which the patient emission data are obtained from the gamma detectors.

25. The system as claimed in claim 24, wherein said at least one processor is further programmed for obtaining the measurements of the relation between the blank transmission attenuation correction and the count rate by acquiring pseudo blank transmission data from the gamma detectors when the patient is absent from the scanner and a line emission source is axially disposed in the scanner.

26. The system as claimed in claim 25, wherein said at least one processor is further programmed for acquiring successive frames of the pseudo blank transmission data, and fitting the successive frames of the pseudo blank transmission data to a function of a total scanner count rate for each frame in order to obtain a blank scan correction factor as a function of the total scanner count rate, and wherein said at least one processor is programmed for using the blank scan correction factor as a function of the total scanner count rate for the adjusting of the blank scan data according to the count rate at which the patient emission data are obtained from the gamma detectors.

27. The system as claimed in claim 26, wherein the total scanner count rate is a total scanner single count rate.

28. The system as claimed in claim 26, wherein the scanner has a coincidence collimated transmission point source system, and the total scanner count rate is a total scanner random count rate.

29. The system as claimed in claim 20, wherein said at least one processor is programmed for correcting for spatially varying count rate effects on the attenuation correction by applying a correction function that is a function of position with respect to the scanner, and that is a non-linear function of a count rate at which the patient emission data are obtained from the gamma detectors.

30. A system for nuclear medical imaging comprising:

a scanner including gamma detectors mounted for being circumferentially disposed about a patient, and a transmission source mounted for transmission scanning of the patient; and at least one data processor coupled to the gamma detectors and programmed for acquiring blank transmission data of gamma events detected by the gamma detectors when a patient is absent from the scanner, and simultaneously acquiring patient emission data and patient transmission data of gamma events detected by the gamma detectors, the patient emission data resulting from radioisotope in a patient, and the patient transmission data resulting from radiation from a transmission source external to the patient including radiation passing through the patient, adjusting the blank scan data according to a count rate at which the patient emission data are obtained from the gamma detectors, using the adjusted blank scan data and the patient transmission data for attenuation correction of the patient emission data, and using the attenuation corrected patient emission data for producing a tomographic image from the patient.

31. The system as claimed in claim 30, wherein said at least one processor is programmed for using the adjusted blank transmission data and the patient transmission for the attenuation correction of the patient emission data by reconstructing an attenuation map and estimating attenuation coefficients using the adjusted blank transmission data and the patient transmission data, and using the attenuation map and estimation of attenuation coefficients for the attenuation correction of the patient emission data.

32. The system as claimed in claim 30, wherein said at least one processor is further programmed for obtaining measurements of a relation between the blank transmission data and a total scan count rate, and using the measurements of the relation between the blank transmission data and the total count rate for adjusting the blank scan data according to the total scan count rate at which the patient emission data are obtained from the gamma detectors.

33. The system as claimed in claim 32, wherein said at least one processor is programmed for obtaining the measurements of the relation between the blank transmission attenuation correction and the count rate by acquiring pseudo blank transmission data from the gamma detectors when the patient is absent from the scanner and a line emission source is axially disposed in the scanner.

34. The system as claimed in claim 33, wherein said at least one processor is further programmed for acquiring successive frames of the pseudo blank transmission data, fitting the successive frames of the pseudo blank transmission data to a function of a total scanner count rate for each frame in order to obtain a blank scan correction factor as a function of the total scanner count rate, using the blank scan correction factor as a function of the total scanner count rate for the adjusting of the blank scan data according to the count rate at which the patient emission data are obtained from the gamma detectors.

35. The system as claimed in claim 34, wherein the total scanner count rate is a total scanner single count rate.

36. The system as claimed in claim 34, wherein the scanner includes a coincidence collimated transmission point source system, and the total scanner count rate is a total scanner random count rate.

37. The system as claimed in claim 30, wherein said at least one processor is programmed for adjusting the blank scan data according to a count rate at which the patient emission data are obtained from the gamma detectors by applying a correction function that is a function of axial, radial, and angular position with respect to the scanner, and that is a non-linear function of the count rate at which the patient emission data are obtained from the gamma detectors.

* * * * *